United States Patent
Hunter et al.

(10) Patent No.: US 6,803,998 B2
(45) Date of Patent: Oct. 12, 2004

(54) ULTRA LOW COST POSITION AND STATUS MONITORING USING FIBER OPTIC DELAY LINES

(75) Inventors: Reginald W. Hunter, Round Rock, TX (US); Joel B. Bailey, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 117 days.

(21) Appl. No.: 10/224,038

(22) Filed: Aug. 20, 2002

(65) Prior Publication Data

US 2004/0036851 A1 Feb. 26, 2004

(51) Int. Cl.[7] .................................................. G01C 3/08
(52) U.S. Cl. ..................................... 356/5.01; 356/5.15
(58) Field of Search .............................. 356/5.01, 5.15, 356/28

(56) References Cited

U.S. PATENT DOCUMENTS

| | | | |
|---|---|---|---|
| 4,521,107 A | * | 6/1985 | Chaborski et al. ......... 356/5.06 |
| 4,674,874 A | | 6/1987 | Halldorsson et al. ....... 356/152 |
| 5,260,563 A | | 11/1993 | Hunter et al. ............... 250/214 |
| 5,510,890 A | * | 4/1996 | Langdon et al. ........... 356/5.09 |
| 5,589,929 A | * | 12/1996 | Li .............................. 356/5.01 |
| 5,748,305 A | | 5/1998 | Shimono et al. ........... 356/237 |
| 6,020,957 A | | 2/2000 | Rosengaus et al. ...... 356/237.4 |

* cited by examiner

*Primary Examiner*—Stephen C. Buczinski
(74) *Attorney, Agent, or Firm*—Moser, Patterson & Sheridan LLP (57) ABSTRACT

Embodiments of the invention provide an improved method and apparatus for sensing position and/or status of an object. For one embodiment, a method generally includes illuminating the object with an optical pulse source and supplying a first optical pulse to a photo-detector, causing a resonant circuit formed by the photo-detector and an inductor to generate a resonant signal. The method also includes supplying at least a second optical pulse to the photo-detector causing a change in the resonant signal, wherein the second optical pulse is reflected from the object, monitoring the change in the resonant signal, and determining a position of the object based on the monitored change in the resonant signal. A velocity, direction of travel and/or acceleration of the object may also be determined from successive position measurements.

44 Claims, 10 Drawing Sheets

ULTRA LOW COST POSITION AND STATUS MONITORING USING FIBER OPTIC DELAY LINES

BACKGROUND OF THE INVENTION

1. Field of the Invention

Embodiments of the present invention generally relate to position monitoring and more particularly to position monitoring using resonant circuits and fiber optic delay lines.

2. Description of the Related Art

Position sensors are used in a wide variety of automated manufacturing applications. For example, in integrated circuit (IC) fabrication, position sensors may be used to determine the precise location of a robot arm, whether a chamber door is open or closed, whether a silicon wafer is properly centered on a wafer handler, and the position or status of many other moving or movable objects. It is not uncommon for an IC fabrication facility processing cluster tool to utilize hundreds of position sensors to monitor the position or status of various objects and associated processes. Due to this high number, the sum cost of the individual sensors may be significant. Therefore, it may be desirable to keep the cost of individual sensors as low as possible. However, while keeping the cost low, it may also be desirable for the sensors to maintain a high level of performance (e.g., response time, sensitivity, etc.), a high level of reliability, and a low level of complexity.

One common type of sensor used for position and status monitoring utilizes fiber optics to detect the position or presence of an object. Typically, a fiber optic position sensor uses an adjacent pair of fiber optic lines, one to carry light from a remote source to an object or target whose position or motion is to be sensed, and the other to receive the light reflected from the object and carry it back to a remote photo sensitive detector (a photo-detector). Basically, the sensors work on a simple principle: if the reflected pulses are detected, the object is present (i.e., within a field of view of the photo-detector).

However, traditional sensors using fiber optics may be susceptible to optical noise, which may affect their reliability. For example, if a photo-detector is exposed to light pulses from sun glints, optical flashes, or florescent light, traditional sensors may provide false position information. One approach to reducing an amount of optical noise that reaches the photo-detector is to use optical filters to filter out wavelengths outside a range of the optical pulse generated to illuminate the object. However, optical filters add additional cost to the sensor, and may be cost prohibitive in certain applications.

Another approach to compensate for optical noise is signal validation through confirmation of a number of optical pulses received by a photo-detector. For example, the sensor may include circuitry to confirm a spacing between multiple pulses is equal and/or that the width of the multiple pulses is consistent. The sensor may produce an indication the object is in the field of view of the sensor only if the pulse width and/or spacing is confirmed (i.e., that uniform pulses are not consistent with typical optical noise). However, the additional circuitry required for signal validation may also add additional cost, as well as complexity, to the sensor. Also, the multiple pulse validation may tend to reduce determinism in the detection.

Yet another approach to compensate for noise is to utilize automatic gain control (AGC) to detect an optical signal a threshold level above a predetermined noise floor. Besides circuitry required for automatic gain control, this approach also requires circuitry to control current to the photo-detector, which may also add additional cost and complexity to the sensor. Further, sensors employing automatic gain control typically have a limited range of approximately 4 inches, which may limit their utility in some applications.

Other types of position sensors utilize linear effects detectors, which tend to have poor resolution and slow response times. Some sensing systems utilize an array of charge-coupled devices (CCDs) to monitor position or status of an object. These systems tend to be relatively expensive and require complex optics. Further, CCD systems typically require a great deal of processing overhead (e.g., a dedicated computer or controller), which adds further cost and complexity.

Therefore, a need exists for an improved method and apparatus for sensing position and/or status of an object that is immune to noise and low in cost.

SUMMARY OF THE INVENTION

The present invention generally provides methods, apparatus and systems for sensing position information of an object utilizing one or more fiber optic delay lines and a resonant circuit.

One embodiment of a method generally includes illuminating the object with an optical pulse source and supplying a first optical pulse to a photo-detector, causing a resonant circuit formed by the photo-detector and an inductor to generate a resonant signal. The method also includes supplying at least a second optical pulse reflected from the object to the photo-detector causing a change in the resonant signal, monitoring the change in the resonant signal, and determining a position of the object based on the monitored change in the resonant signal. A velocity and direction of travel of the object may also be determined from successive position measurements.

One embodiment of an apparatus generally includes a means for illuminating the object and a resonant circuit formed by a photo-detector and an inductor. The apparatus also includes a first fiber optic line to supply a first optical pulse to the photo-detector, causing the resonant circuit to generate a resonant signal and at least a second fiber optic line to supply a second optical pulse reflected from the object to the photo-detector causing a change in the resonant signal. The apparatus also includes control circuitry adapted to monitor the resonant signal and determine a position of the object based on the resonant signal. The first fiber optic line may supply the first optical pulse directly from the illuminating means. Alternatively, the first fiber optic line may be positioned to receive an optical pulse reflected from the object and supply the reflected optical pulse as the first optical pulse.

Another embodiment of an apparatus generally includes a means for illuminating an object having an aperture formed therein and a resonant circuit formed by a photo-detector and an inductor. The apparatus also includes one or more fiber optic delay elements, each having a first fiber optic line to supply a first optical pulse passing through the object aperture to the photo-detector, causing the resonant circuit to generate a resonant signal and a second fiber optic line to supply a second optical pulse passing through the object aperture to the photo-detector causing a change in the resonant signal. The apparatus also includes control circuitry adapted to monitor the resonant signal and determine a position of the object based on the resonant signal.

One embodiment of a system generally includes a target attached to the object, a means for illuminating the target, and a resonant circuit comprising a photo-detector and an inductor. The system also includes a first fiber optic line to supply a first optical pulse to the photo-detector, causing the resonant circuit to generate a resonant signal, and at least a second fiber optic line to supply a second optical pulse reflected from the target to the photo-detector causing a change in the resonant signal. The system also includes control circuitry adapted to monitor the resonant signal and determine a status of the object based on the resonant signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the invention generally provide an apparatus and method for determining the position or status of an object utilizing fiber optic delay lines and a resonant circuit.

Figure 1:
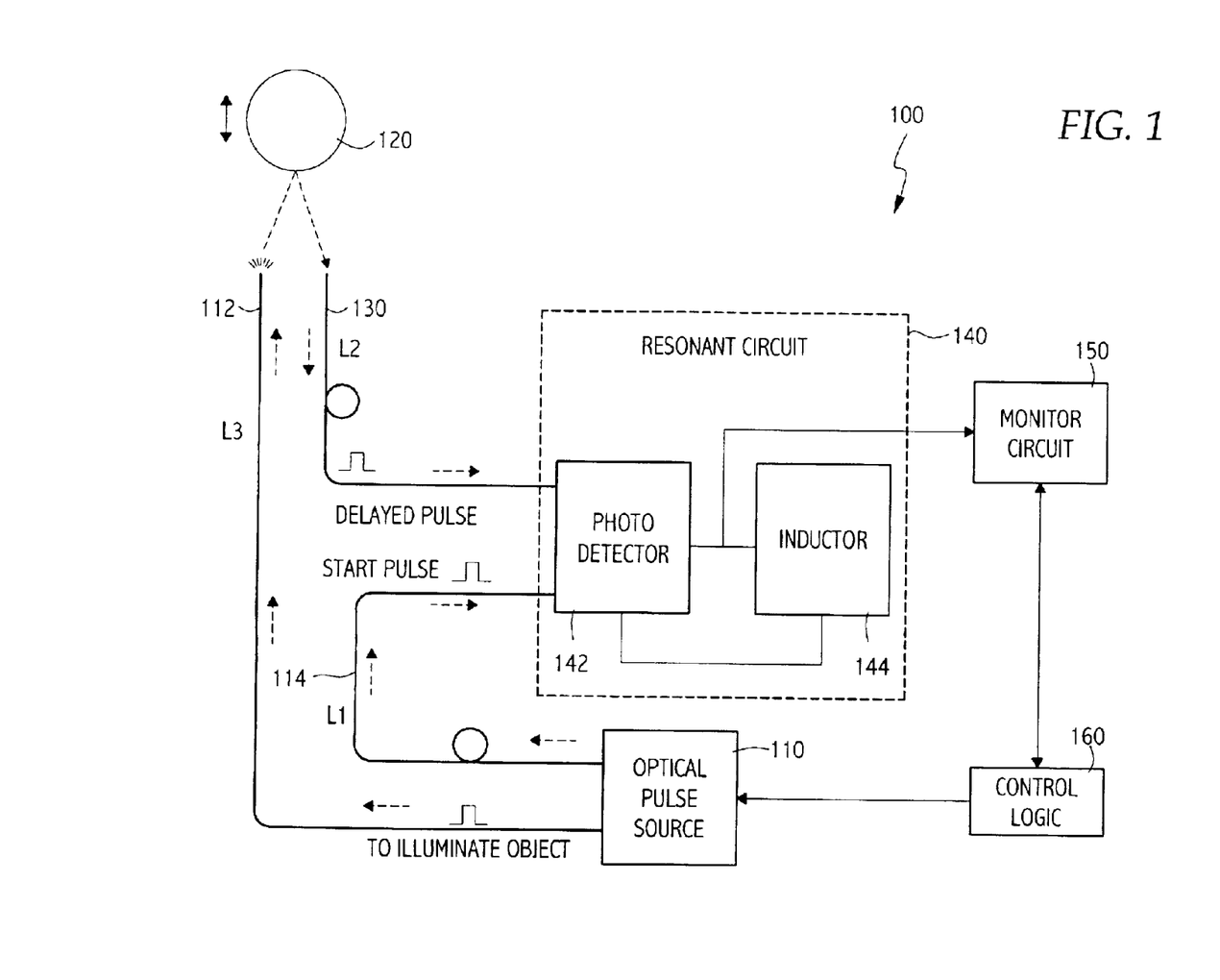
FIG. 1 illustrates a block diagram of one embodiment of a system for monitoring position of an object utilizing fiber optic delay lines and a resonant circuit.

For example, FIG. 1 illustrates a block diagram of one embodiment of an apparatus 100 for determining distance position of an object 120 utilizing a fiber optic delay line 130 (hereinafter "delay line") and a resonant circuit 140. The apparatus 100 includes an optical pulse source 110 to generate optical pulses to illuminate the object 120. The object 120 may be a device of interest (i.e., a device for which position information is desired), or a specially designed target object attached to a device of interest. For example, the object 120 may be of a specific shape and/or material to optimize reflective properties for a particular application. The object 120 may be attached to any suitable device of interest, such as a silicon wafer, a wafer handler (e.g., a robot arm), an end effector of a robot arm, or a slit valve door. As illustrated by the arrows, the object 120 may be moving along a line towards or away from the delay line 130.

The optical pulse source 110 may be any suitable device capable of producing optical pulses. For example, the optical pulse source 110 may be a pulsed light emitting diode (LED), a pulsed laser, or any other type of suitable device presently known or to be developed. The type of device selected as the optical pulse source 110 may be determined by system requirements. For example, while pulsed LEDs may have a slower rise time (approx. 700 ns) than pulsed lasers (approx. 2 ns), they may be lower in cost and require less power. For some embodiments, the optical pulse source 110 may generate an optical pulse in response to a control signal provided by a control logic circuit 160.

For some embodiments, a fiber optic line 112 may supply a generated pulse from the optical pulse source 110 to the object 120. For other embodiments, the optical pulse source 110 may be positioned to illuminate the object 120 directly. The apparatus 100 may also include a fiber optic line 114 optically coupled between the optical pulse source 110 and a photo-detector 142. The fiber optic line 114 may supply a generated pulse (a "start pulse") to the photo-detector 142, causing the resonant circuit 140 formed by the photo-detector 142 and an inductor 144 to generate a resonant signal. For some embodiments, a start pulse may be supplied to the photo-detector 142 via the line 114 concurrently with supplying an optical pulse to illuminate the object 120 via the line 112.

One end of the delay line 130, or an aperture (not shown) coupled with one end of the delay line, is positioned to receive optical energy (in the form of optical pulses) reflected from the object 120, while the other end is optically coupled to the photo-detector 142. Accordingly, the delay line 130 may supply optical pulses reflected from the object 120 to the photo-detector 142. While not represented in FIG. 1, for some embodiments, the apparatus 100 may also include optical elements, such as lenses, filters, or diffusers, optically coupled with the delay line 130 to help collect optical energy. For example, the use of diffusers may allow for highly controlled fields of view. Further, for some embodiments, multiple fiber optic delay lines 130 of the same length may be used to increase collected energy, which may expand a usable range and/or expand a field of view to detect the object 120.

The propagation delay of an optical pulse through a fiber optic line is proportional to the length of the fiber optic line. For example, each foot of optical fiber typically corresponds to a propagation delay of approximately 9 ns. Therefore, the arrival time of reflected pulses supplied to the photo-detector 142 via the delay line 130 may be controlled by varying the length of the delay line 130. For some embodiments, the length of the delay line 130 may be selected to ensure the reflected pulses arrive at the photo-detector 142 at a specific time after the start pulse supplied to the photo-detector 142 via the fiber optic line 114 (i.e., after the resonant signal has begun oscillating). Additional lengths of optical fiber in a fiber optic line, such as lines 112 and 130, are represented in FIG. 1 (and subsequent Figures) as loops in the lines.

The arrival of the delayed reflected pulses after the start pulse may cause a change in the resonant signal. This change in the resonant signal may be detected by the monitor circuit 150 and control logic 160, providing positive indication of the arrival of the reflected pulses through the delay line 130 and, hence, a location of the object 120 in a field of view of the delay line 130.

Figure 2:
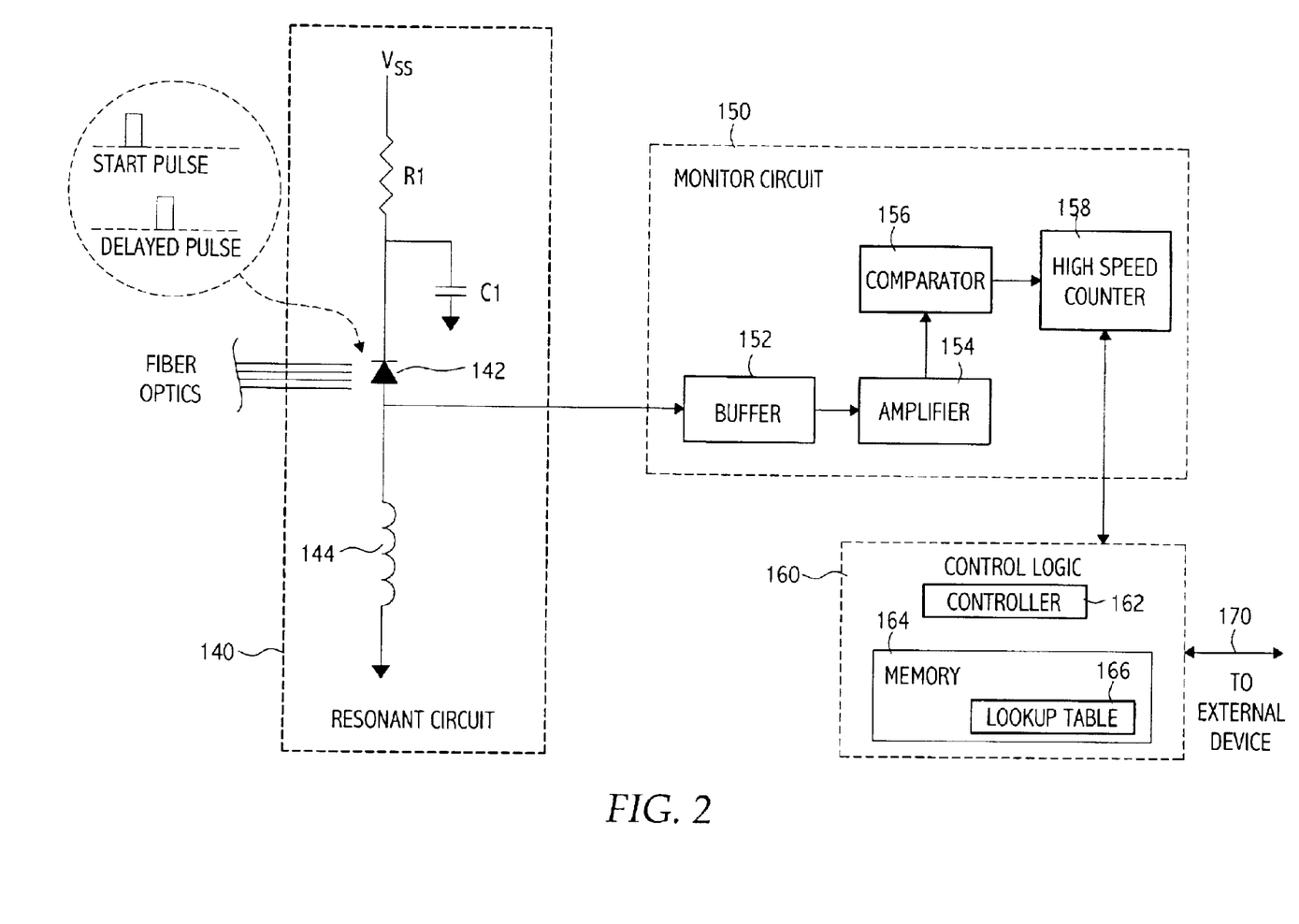
FIG. 2 illustrates a schematic view of one embodiment of the resonant circuit of FIG. 1.

FIG. 2 illustrates a schematic view of the resonant circuit 140, monitor circuit 150 and control logic 160. The resonant circuit 140 may be formed by placing the photo-detector 142 in parallel with the inductor 144. The resonant circuit 140 may also include a resistor R1 and a capacitor C1 to filter and bypass a supply voltage $V_{SS}$. The capacitance of the resonant circuit 140 is provided by the internal capacitance of the photo-detector 142, typically between 10 pf and 50 pf. When exposed to a rapidly rising optical pulse (e.g., a start pulse or delayed pulse), the photo-detector 142 will attempt to drive current through the inductor 144. The inductor 144 will resist changes in the current and convert the energy into magnetic flux. Hence, the photo-detector 142 acts as a capacitor and a signal generator.

After the optical pulse, the magnetic field in the inductor 144 will collapse and drive current back to the photo-detector 142 to charge the internal capacitor. Once the capacitor is charged, the voltage stored in the photo is dumped back into the inductor 112. This sinusoidal oscillation of energy back and forth between the inductor 144 and the photo-detector 142 occurs at a natural resonant frequency of the resonant circuit, until the resonant signal is eventually dampened out. The quality factor of the resonant circuit 140 along with the magnitude, rise time and duration of the optical pulse determines how many cycles of resonant oscillation will take place.

For some embodiments, the resonant circuit 140 may provide enhanced noise immunity when compared to conventional sensors using photo-detectors. For example, if the photo-detector 142 is exposed to light pulses from sun glints, optical flashes, and florescent light it may attempt to drive current into the inductor. As previously described, in conventional sensors, this energy is typically reduced through the use of optical filters that are selected for the wavelength of the pulsed source. However, because the rise times of these background sources are typically significantly longer than the pulsed source required to excite the resonant circuit 140, embodiments of the apparatus 100 may omit optical filters, which may reduce overall cost. In other words, the resonant circuit 140 may provides natural bandpass filtering. Further, a single pulse of 10 ns or less may be required to excite the resonant circuit 140, and, depending on the natural resonant frequency of the resonant circuit 140, a response time to detect a change in the resonant signal may be less than 5 µs.

The period of the natural resonant frequency of the resonant circuit is defined by the capacitance in the photo-detector 142 and the value of the inductor 144, and may vary with different embodiments. The photo-detector 142 and inductor 144 may be chosen based on the characteristic of the optical pulses provided by the optical pulse source 110. For example, for one embodiment, the inductor 144 may have a value of approximately 220 uH and the photo-detector 142 may have an internal capacitance in a range of 10–50 pf, corresponding to a resonant frequency range of approximately 1.5 to 3.4 MHz. However, the period of a resonant signal may be changed with the arrival of additional optical pulses.

For example, if a reflected (delayed) optical pulse arrives at the photo-detector 142 within the first half cycle of resonance, the photo-detector 142 may stimulate the resonant circuit 140 in the same manner as described with reference to the start pulse, and the two sine waves may add together constructively. For some embodiments, a length of the delay line 130 may be designed to deliver a reflected pulse to the photo-detector 142 within the first quarter cycle or resonance, which may ensure the sine waves add together optimally.

Figure 3:
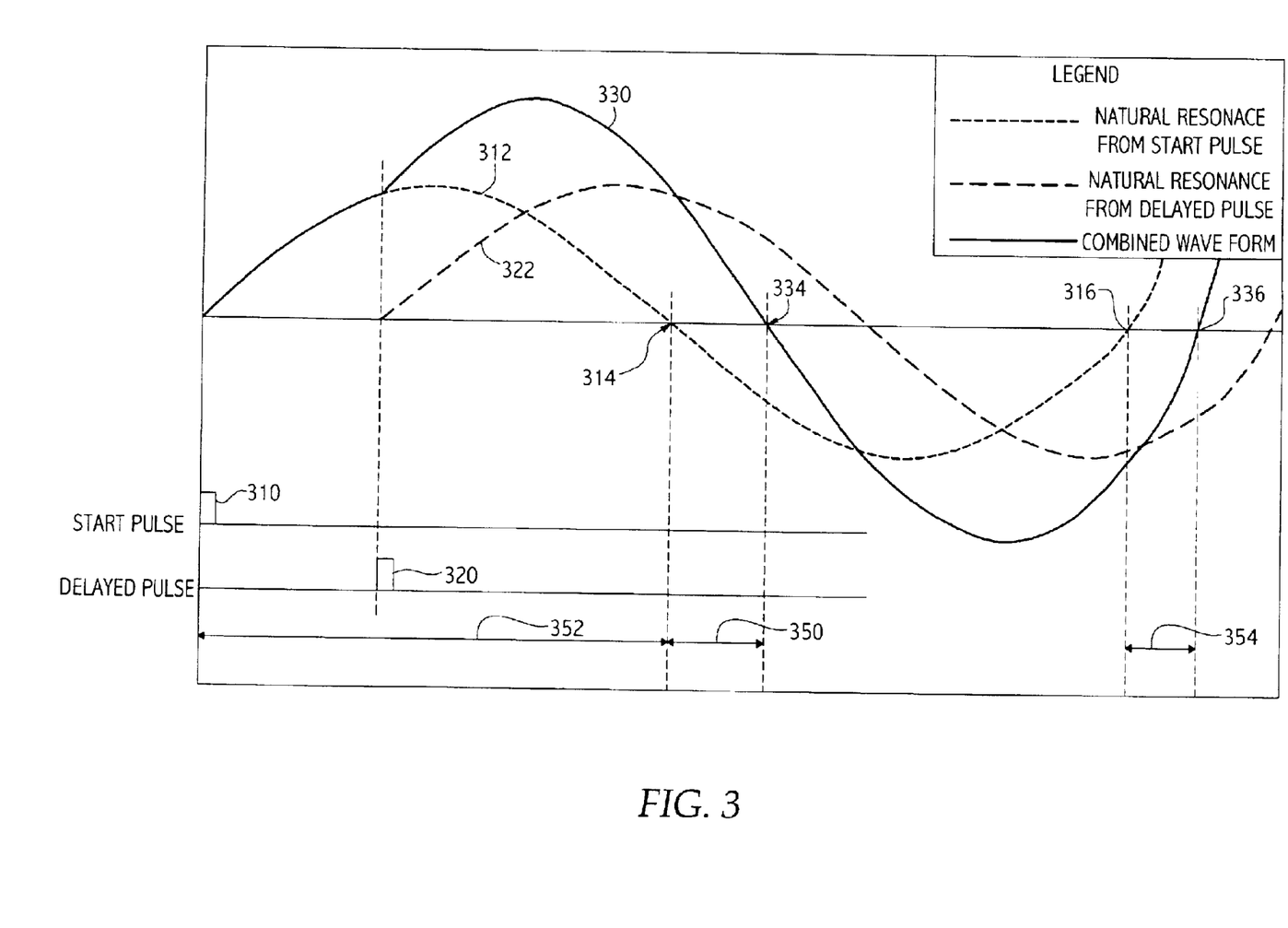
FIG. 3 illustrates an exemplary signal generated by the resonant circuit of FIG. 1 when exposed to two optical pulses offset in time.

This change in the resonant signal may be described with reference to FIG. 3, which illustrates an exemplary signal 330 generated by the resonant circuit 140. A start pulse 310 supplied to the photo-detector 142 causes the resonant circuit 140 to generate a resonant signal, represented by the waveform 312, oscillating at the natural resonant frequency ($f_R$) of the resonant circuit 140. As illustrated, absent additional pulses, the waveform 312 would have a first zero crossing 314 at ½ $f_R$.

A delayed pulse 320 (e.g., a reflected pulse supplied to the photo-detector 142 via the delay line 130) may also cause the photo-detector 142 to stimulate the resonant circuit 140. Waveform 322 represents the natural resonant signal induced by the delayed pulse 320. As described above, for some embodiments, the delayed pulse 320 may be supplied to the photo-detector 142 typically within the first quarter cycle (¼ $f_R$) of resonance, in an effort to ensure the waveforms 312 and 322 add constructively. For example, if the natural resonance frequency is 1 MHz (period=1 µs), the delayed pulse 320 may be supplied to the photo-detector 142 within 0.25 µs (250 ns) of the start pulse 310.

Therefore, as illustrated, the waveforms 322 and 312 are constructively added together, resulting in the combined waveform 330. Absent the delayed pulse 320, the waveform 312 would have a first zero crossing 314 at one half the natural resonant period (½ $f_R$). However, as illustrated, the combined waveform 330 has a first zero crossing 334 that is extended by a delay time 350. As will be described in greater detail below with reference to FIG. 4, the timing of the first zero crossing 334 may be determined by both the amplitude of the delayed pulse 320 (with respect to the start pulse 310) and the amount of delay between the arrival of the start pulse 310 and the delayed pulse 320.

Referring back to FIG. 2, the monitor circuit 150 may be adapted to detect this change in the first zero crossing 334 caused by the additional pulse 320. As illustrated, the monitor circuit 150 may generally include a buffer 152 an amplifier 154, a comparator 156, and a high-speed counter 158. The buffer 152 may provide a high impedance input to receive the resonant signal while providing a low impedance output to drive the amplifier 154. The high input impedance of the buffer 152 may prevent excessive loading of the resonant circuit 140 which may cause excessive decay of the resonant signal.

An output of the amplifier 154 may be applied to the input of the comparator 156. A threshold level of the comparator 156 may be set to provide a switched output upon detection of the first zero crossing 334 of the resonant signal 330. The output of the comparator 156 may gate the high speed counter 158 when the first sinusoidal zero crossing 334 has been detected, thus capturing the time interval (i.e., interval 352 plus delay 350) of the first zero crossing 334. The high speed counter 158 may be any suitable type high speed counter presently known or not yet developed. For example, the counter 158 may be an emitter-coupled logic (ECL) counter having a resolution of better than (less than) 1 ns.

The control logic 160 may be configured to read a count value from the counter 158 indicative of a time interval of the first sinusoidal zero crossing 334. For example, the control logic 160 may include a controller 162 programmed to read a count value from the counter 158 to determine a first zero crossing time. For some embodiments, the counter 158 may be internal to the controller 162. However, an internal counter may be limited in resolution by an operating frequency of the controller. Regardless, the controller 162 may be programmed to compare the measured first zero crossing time to the known (natural) first zero crossing time (½ $f_R$) to determine the additional zero crossing delay 352 caused by the delayed pulse 320.

The controller 162 may also be configured to reset the counter 158, for example, prior to signaling the optical pulse source 110 to generate an optical pulse to illuminate the object, or directly after reading a count value from the counter 158. Alternatively, the comparator circuit 156 may generate a signal to reset the counter 158 in response to detecting a start pulse as indicated by the generation of the resonant signal.

For some embodiments, rather than just determine a presence of the object 120, the controller 162 may be programmed to determine a relative distance of the object 120 based on the first zero crossing time. For example, referring back to FIG. 1, as the object 120 gets nearer, the amount of optical energy collected by the delay line 130 should increase, resulting in a delayed pulse with a greater amplitude. A delayed pulse with a greater amplitude may correspond to a greater delay in the first zero crossing.

Figure 4:
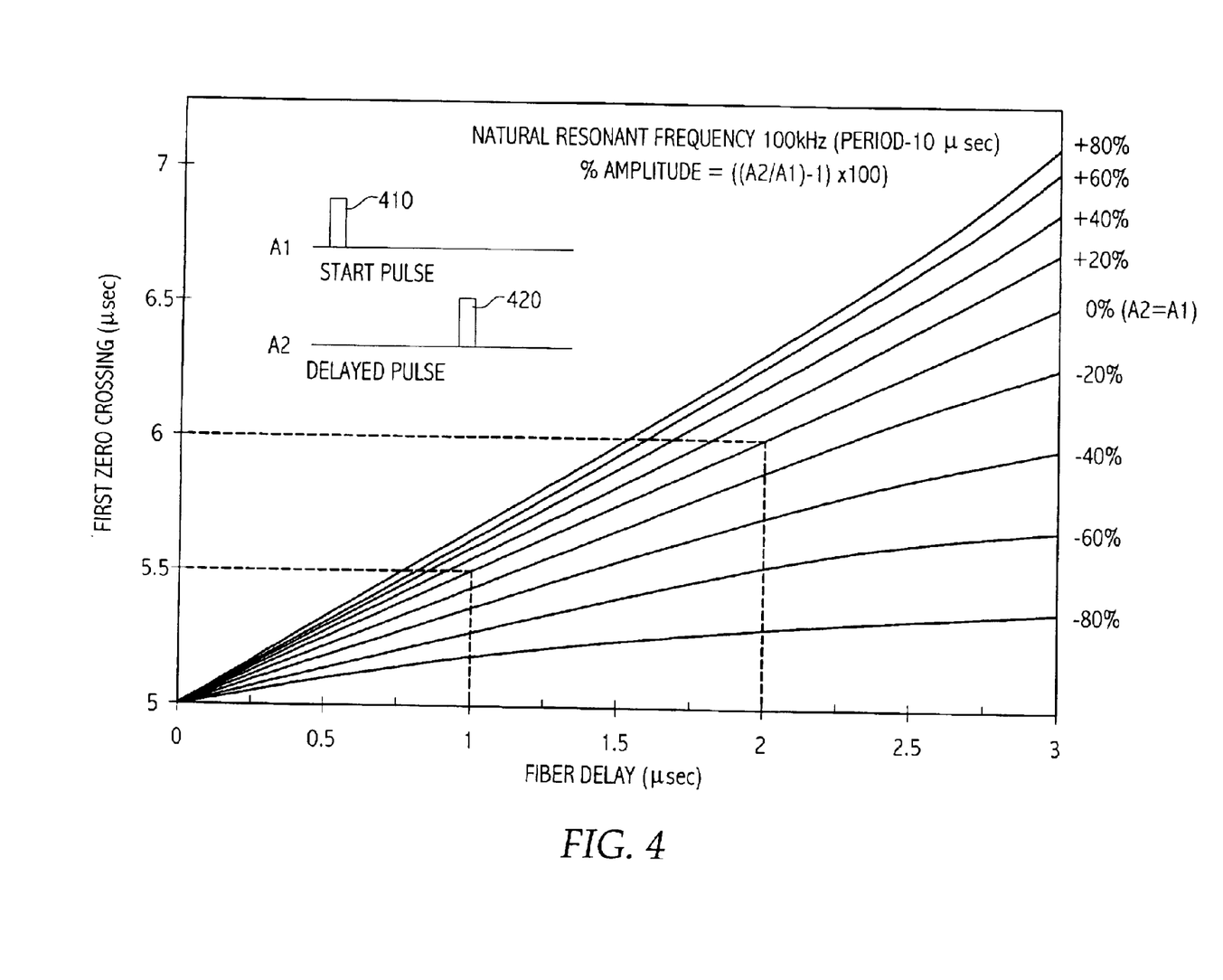
FIG. 4 illustrates an exemplary chart of resonant signal zero crossing times for different fiber optic delays and delayed pulse amplitudes.

For example, FIG. 4 illustrates an exemplary chart of resonant signal zero crossing times for different fiber optic delays and relative optical pulse amplitudes. The different lines represent different ratios of the amplitudes of the delayed pulse 420 with respect to the start pulse 410. FIG. 4 assumes natural resonant frequency of 100 kHz (for illustrative purposes only). Accordingly, the first zero crossing of the natural resonant signal is 5 $\mu$s (½ $f_R$). In other words, with no delayed pulse 410 (or if the delayed pulse 410 arrives concurrently with the start pulse 410), the first zero crossing is 5 $\mu$s.

If the delayed pulse is equal in amplitude to the start pulse (i.e., A2=A1), the first zero crossing may be delayed by one half the delay. This is illustrated by the dashed lines in FIG. 4. For example, if the delayed pulse 420 arrives at the photo-detector 142 2 us after the start pulse 410, the first zero crossing will be extended 1 us (from 5 us to 6 us). It can also be seen from FIG. 4 that an increase in amplitude of the delayed pulse 420 results in a larger delay in the first zero crossing, while a decrease in amplitude results in a smaller delay in the first zero crossing.

Therefore, referring back to FIGS. 1 and 2, as the object 120 gets closer to the delay line 130, the amplitude of the delayed pulses will generally get larger and the first zero crossing time should increase. Accordingly, the controller 162 may be programmed to determine a distance of the object 120 relative the delay line 130 (or an aperture of the delay line 130) based upon the measured first zero crossing time. For some embodiments, the controller 162 may be configured to access a lookup table 166 containing distance values for the object 120 for different first zero crossing times. For example, the controller 162 may read a count from the counter 158 indicative of the first zero crossing and lookup a distance from the lookup table 166 based directly on the count. As illustrated, the lookup table 166 may be stored in a memory 164, which may be any suitable type of memory, internal or external to the controller 162. Alternatively, the controller 162 may be configured to determine the distance of the object 120 based on an equation or algorithm.

For some applications, an advantage of using a lookup table or algorithm may be to easily correct for non-linearities in the relationship between an amount of energy reflected from the object 120 and the relative distance. Further, a value may be retrieved from the lookup table 166 without complicated programming instructions. Accordingly, the controller 162 may be a relatively inexpensive controller, reducing an overall cost of the apparatus. It will be appreciated to those skilled in the art that, for some embodiments, the apparatus may first be calibrated manually or automatically. A simple calibration routine may include taking first zero crossing readings with the object 120 at known locations. The first zero crossing readings may be used, for example, to calculate an offset into the lookup table 166. Alternatively, the readings may be used to calculate the entire lookup table 166. Further, for some embodiments, the controller 162 may be configured to use calibration points to perform distance calculations using piecewise linearization techniques.

For some embodiments, the controller 162 may also be configured to calculate a relative velocity of the object 120. For example, the controller 162 may be configured to calculate a relative velocity of the object 110 by calculating the difference between successive distance measurements and dividing the difference by the elapsed time between measurements. A sign of the relative velocity may also provide an indication of the direction the object 120 is traveling. Similarly, the controller 162 may be configured to calculate an acceleration of the object 120 by calculating the difference between successive velocity measurements and dividing the difference by the elapsed time between measurements.

As illustrated, the control logic 160 may also include an I/O interface 170 to communicate with an external device, such as an external controller that may monitor a number of sensors. The I/O interface 170 may provide any suitable signal, such as a digital signal, an analog signal, frequency signal or a pulse width modulated (PWM) signal. For some embodiments, the I/O interface 170 may simply provide a Boolean (On/Off) indication of whether an object is present or not (i.e., in the field of view of the sensor). Alternatively, the I/O interface 170 may provide an analog indication of a position of the object or a relative velocity of the object. For other embodiments, the I/O interface 170 may also be any suitable parallel or serial bussed output, implementing any suitable communications protocol.

For some embodiments, rather than detect the first zero crossing, the monitor circuit 150 may be configured to detect another zero crossing. Further, for still other embodiments, the monitor circuit 150 may detect the change in the resonant signal by monitoring an energy of the resonant signal. For example, the amplifier 154 may be a logarithmic amplifier that generates an output directly proportional to amplitude modulated envelope of the decaying sinusoidal signal. The peak amplitude of this logarithm output may be captured and used to determine the amount of energy being delivered to the resonant circuit 140 and determine the location of the object.

Figure 5:
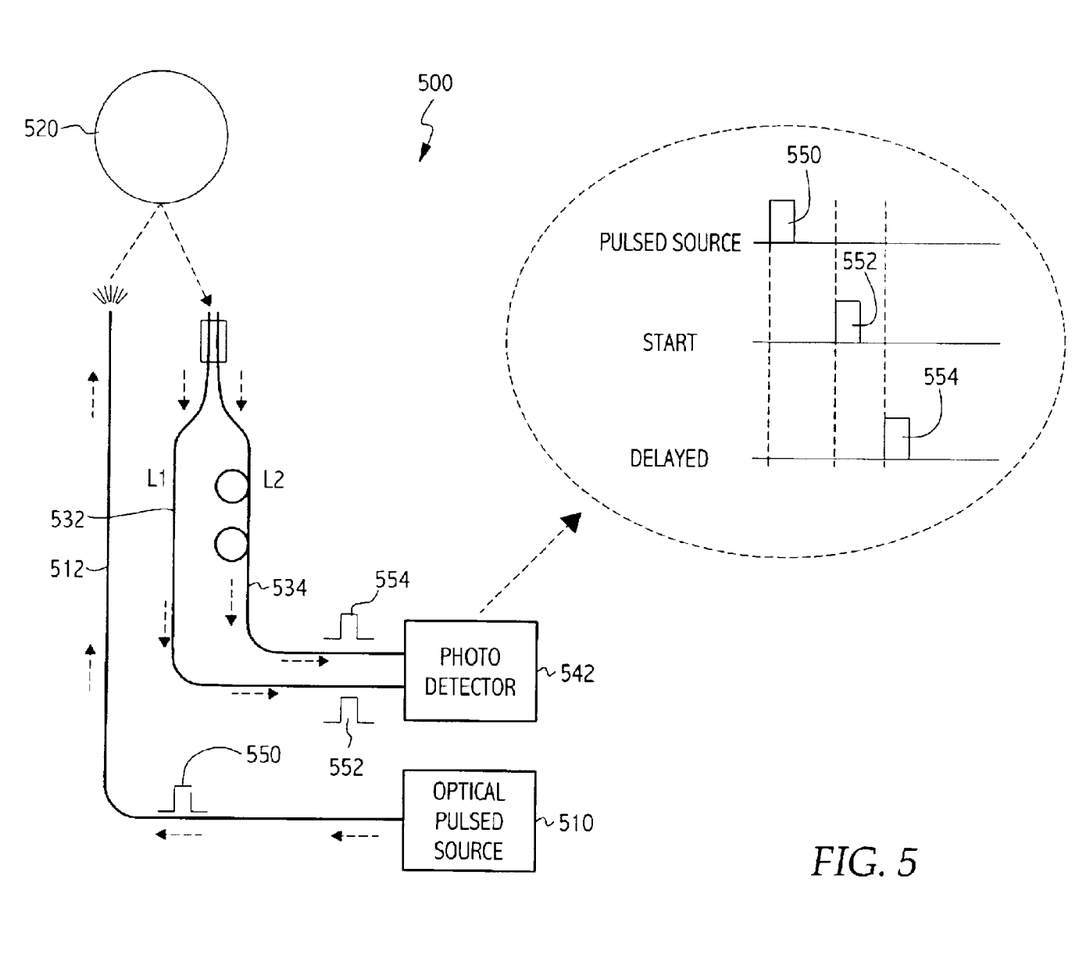
FIG. 5 illustrates one embodiment of a fiber optic delay element for capturing and delivering substantially identical pulses, offset in time, to a photo-detector.

For some applications, it may be useful to generate substantially identical start pulses and delayed pulses. FIG. 5 illustrates one embodiment of a fiber optic delay element 500 for generating a start pulse 552 and a substantially identical delayed pulse 554. An optical pulse 550 is generated by an optical pulse source 510 to illuminate an object 520 directly or via optical fiber 512. A start pulse 552 reflected from the object 520 is supplied to a photo-detector 542 via a fiber optic line 532, causing a resonant circuit formed by the photo-detector 542 and an inductor (not shown) to generate a resonant signal as previously described. The fiber optic line 532, or an aperture (not shown) coupled with one end of the fiber optic line 532, is positioned adjacent a delay line 534. Therefore, an amount of optical energy received by the fiber optic line 532 and the delay line 534 is substantially equal. Accordingly, the start pulse 552 and a delayed 554 supplied by the delay line 534 are substantially equal in shape and amplitude.

An arrival of the start pulse 552 and the delayed pulse 554 may be controlled by varying the lengths L1 and L2 of the fiber optic line and the delay line 534, respectively. As previously described, for some embodiments, L2 may be chosen to ensure the arrival time of the delayed pulse 554 is within a first quarter cycle of a resonant period of the resonant signal induced by the start pulse 552. It should be noted that the photo-detector 542 of FIG. 5 receives a start pulse 552 only if the object 520 is in a field of view of the fiber optic line 532. This is in contrast to the photo-detector 142 illustrated in FIG. 1 that received a start pulse directly from the optical pulse source 110 via the fiber optic line 114. Accordingly, the resonant signal may only be generated if the object 520 is in the field of view of the fiber optic line 532. In other words, the fiber optic delay element 500 may allow the presence of the object to be detected.

Figure 6:
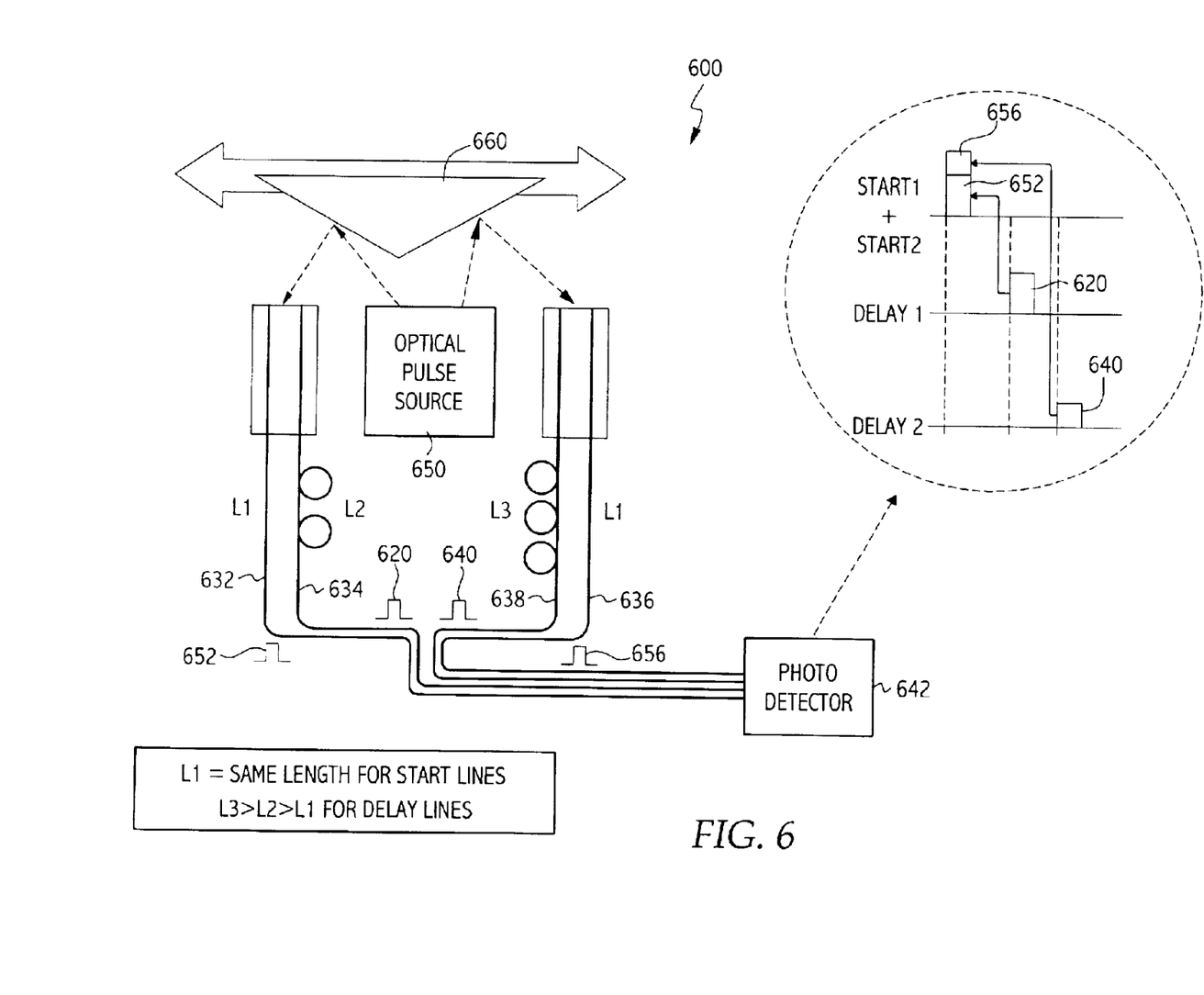
FIG. 6 illustrates a block diagram of a system for monitoring position of an object utilizing the fiber optic delay element of FIG. 5.

As illustrated in FIG. 6, for some embodiments, more than one fiber optic delay element may be combined to form an apparatus 600 for monitoring a position of an object 660. The delay elements may be placed adjacent an optical pulse source 650, on opposite sides. Further, the pulse source 650 may be incorporated in the object 660. One fiber optic delay element includes a start line 632 adjacent a delay line 634 while another delay element includes a start line 636 adjacent a delay line 638. The start lines 632 and 636 may have identical lengths, L1, while the delay lines 634 and 638 may have different lengths, L2 and L3. As illustrated, the lengths may be chosen such that a delayed pulse 640 supplied through the delay line 638 arrives at a photo-detector 642 after a delayed pulse 620 supplied through the delay line 634 (i.e., L1<L2<L3). While not illustrated in FIG. 6, it should be understood that the detector 642 may be coupled with an inductor to form a resonant circuit which may be monitored by a monitor circuit and control logic previously described with reference to FIGS. 1 and 2.

As illustrated, an optical pulse source 650 generates optical pulses to illuminate the object 660. As previously described, optical pulses 652 and 620 supplied to the photo-detector 642 through the fiber optic line 632 and the delay line 634, respectively, may be substantially identical. Similarly, optical pulses 656 and 640 supplied to the photo-detector 642 through the fiber optic line 636 and the delay line 638, respectively, may be substantially identical. Because the lengths of the fiber optic lines 632 and 636 are substantially equal (L1), the start pulses 652 and 656 will arrive at the photo-detector 642 at the same time. Hence, the amplitude of the start pulse seen by the photo-detector 642 will be the sum of the start pulses 652 and 656, which is substantially equal to the sum of the delayed pulse 620 and the delayed pulse 640.

As a target object 660 moves (along the directions of the arrows) in and out of the field of view of the two fiber optic delay elements, the energy received by each element varies. However, the total amplitude of the start pulse seen by the photo-detector 642 will always be substantially equal to the sum of the delayed pulses 620 and 640. Thus, the apparatus 600 is self-normalizing and may be less sensitive to variations in amplitude (e.g., due to aging, temperature variations, etc.) than traditional sensors. Further, by monitoring the change in the resonant signal caused by the delayed pulses 620 and 640, which may have different amplitudes and arrival times, a position of the object 660 may be determined by a single sensor with greater resolution than traditional sensors.

Figure 7:
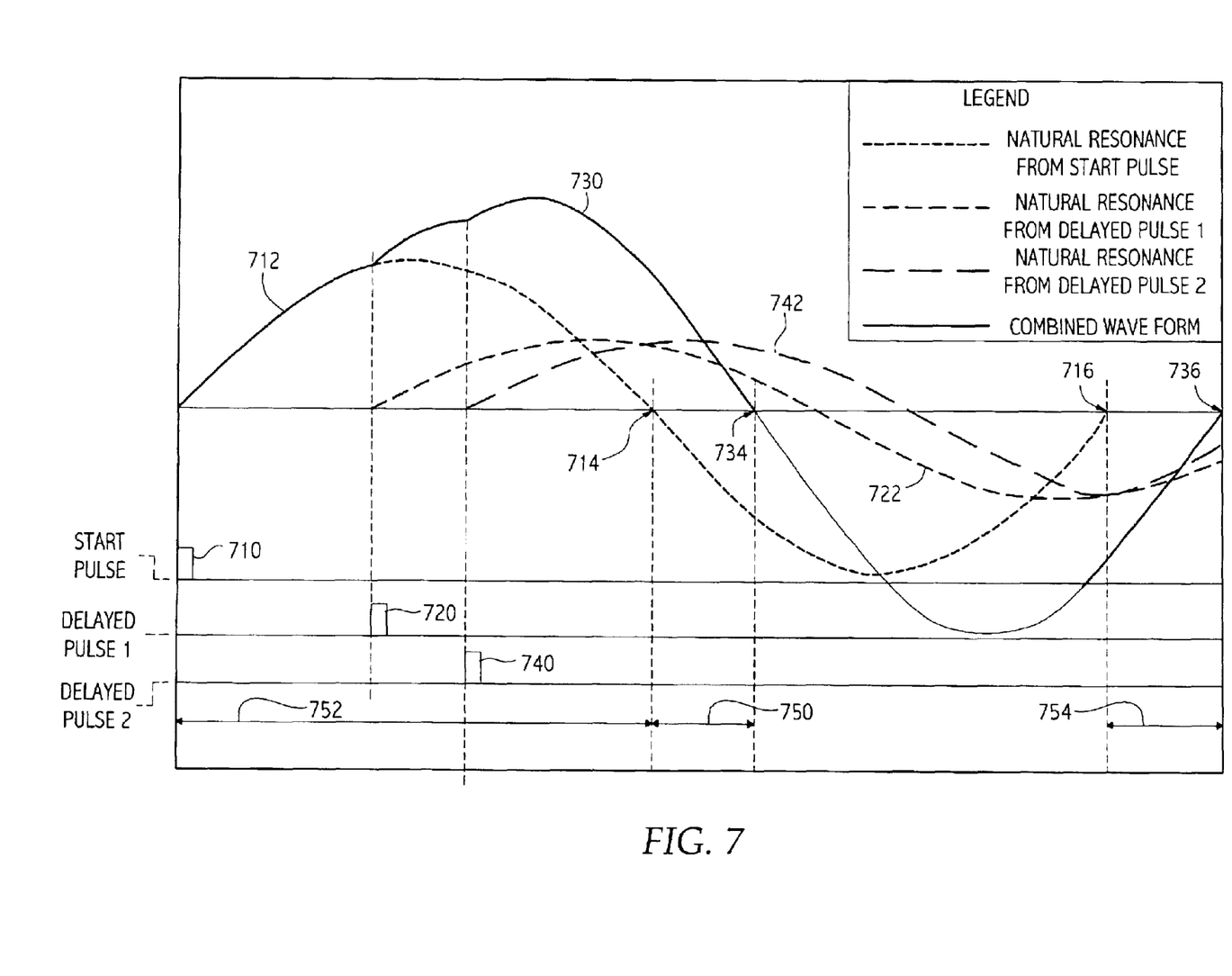
FIG. 7 illustrates an exemplary resonant signal generated by a resonant circuit when exposed to a start pulse and two delayed pulses offset in time.

This change in the resonant signal caused by the delayed pulses 620 and 640 may be described with reference to FIG. 7, which illustrates an exemplary resonant signal 730. A start pulse 710 supplied to the photo-detector 642 causes a resonant circuit 140 formed by the photo-conductor and an inductor to generate a resonant signal, represented by the waveform 712, oscillating at the natural resonant frequency ($f_R$) of the resonant circuit. As previously described, the start pulse 710 may be a summation of start pulses supplied through the fiber optic lines 632 and 636.

A delayed pulse 720 (e.g., a reflected pulse supplied to the photo-detector 642 via the delay line 634) may also cause the photo-detector 642 to stimulate the resonant circuit. Waveform 722 represents the natural resonant signal induced by the delayed pulse 720. The waveforms 722 and 712 are constructively added together, resulting in the combined waveform 730. A second delayed pulse 740 (e.g., a reflected pulse supplied to the photo-detector 642 via the delay line 638) may also cause the photo-detector 642 to stimulate the resonant circuit. Waveform 742 represents the natural resonant signal induced by the delayed pulse 740. The waveforms 742 are also constructively added to the combined waveform 730.

Absent the delayed pulses 720 and 730, the waveform 712 would have a first zero crossing 714 at one half the natural resonant period (½ $f_R$). However, as illustrated, the combined waveform 730 has a first zero crossing 734 that is extended by a delay time 750. The timing of the first zero crossing 734 may be determined by a position of the object 660 relative to the two fiber optic delay elements.

For example, if the object 660 is only in a field of view of the first fiber optic delay element (i.e., the fiber optic line 632 and the delay line 634), no optical energy will be received by the second fiber optic delay element. Therefore, the start pulse 710 will be substantially equal in amplitude to the delayed pulse 720. Accordingly, as previously described with reference to FIG. 4, the natural first zero crossing 714 will be extended by one half the delay between the start pulse 710 and the delayed pulse 720. For example, if the delay between the start pulse 710 and the delayed pulse 720 is D1, the delay 750 may be substantially equal to D1/2. Similarly, if the object 660 is only in a field of view of the second fiber optic delay element (ie., lines 636 and 638), the natural first zero crossing 714 will be will be extended by one half the delay (i.e., D2) between the start pulse 710 and the delayed pulse 730.

Therefore, as the object 660 moves through the fields of view of the optical delay elements, the natural first zero crossing 714 of the resonant signal will always be extended by a value between D1/2 and D2/2. Accordingly, when the object 660 is within a field of view of both fiber optic delay elements, a position of the object 660 relative to the delay elements may be determined by measuring a delay in the first zero crossing of the resonant signal and interpolating between locations corresponding to the delays of each element (D1/2 and D2/2). Because of this interpolation, the apparatus 600 may provide additional resolution over traditional sensors that provide only an indication of the presence of an object in the sensors field of view.

As previously described, a monitor circuit and control logic may be configured to monitor the resonant signal and determine a position of the object based on the monitored resonant signal. For example, the monitor circuit may include a comparator and a counter to generate a count indicative of the first zero crossing of the resonant signal. Further, a controller may be programmed to read the count from the counter and retrieve a value from a lookup table (or calculate a value using an equation or algorithm) to determine a position of the object 660 relative to the two fiber optic delay elements. Further, for some embodiments, the controller may also be programmed to determine the velocity and/or acceleration of the object based on successive position measurements.

Figure 8:
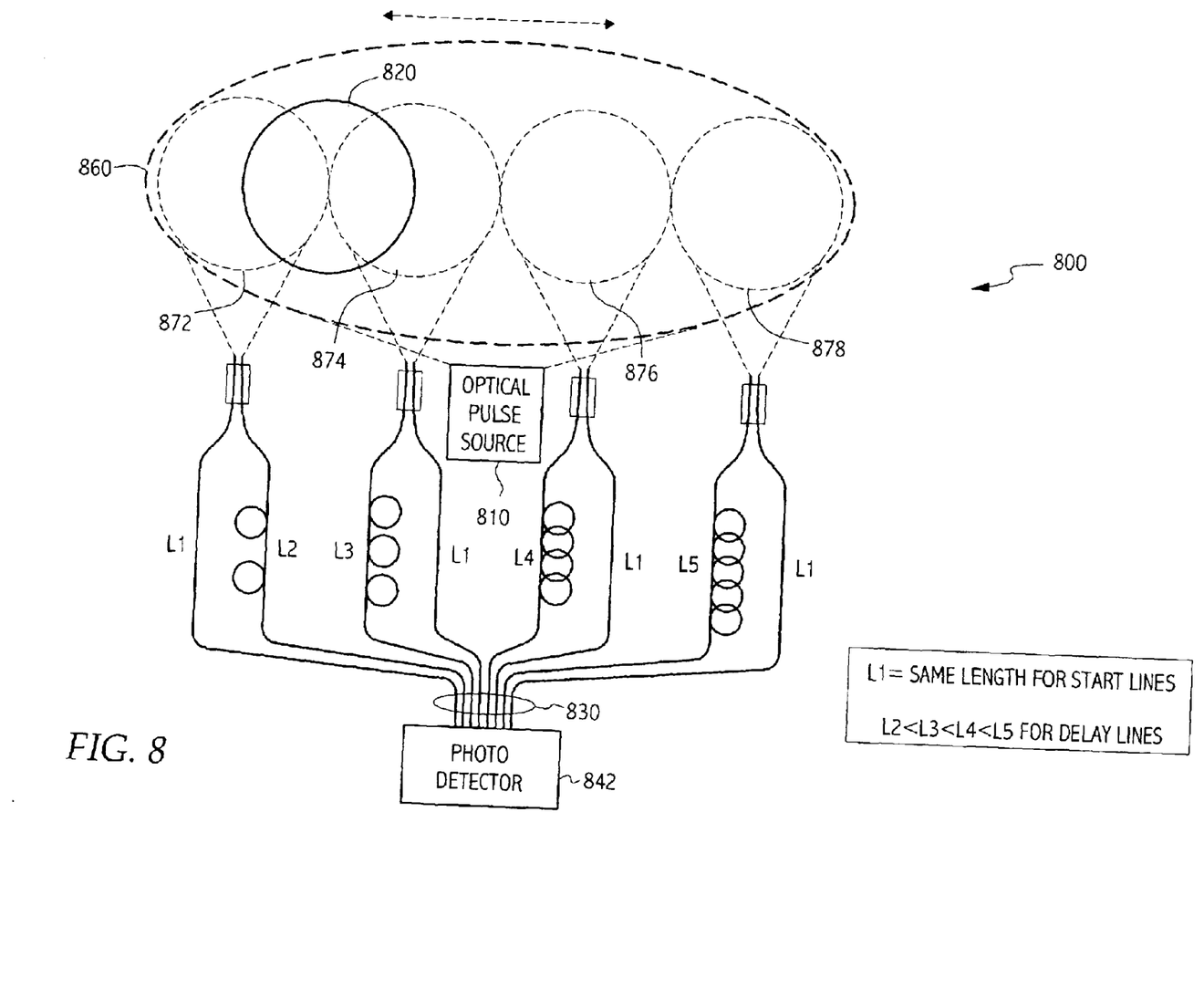
FIG. 8 illustrates a block diagram of another system for monitoring position of an object utilizing the fiber optic delay element of FIG. 5.

As illustrated in FIG. 8, an apparatus 800 may include more than two fiber optic delay elements, for example, to increase a range and/or resolution of position measurement of an object 820. An optical pulse source 810 generates optical pulses to illuminate an object 820 as it moves through an illumination area 860. As illustrated, each fiber optic delay element includes a start line having a length L1 and a delay line of a differing length (i.e., L2, L3, L4 and L5). Accordingly, each delay line may supply a delayed pulse delayed from a start pulse by a value corresponding to its length. While not illustrated in FIG. 8, it should be understood that the detector 842 may be coupled with an inductor to form a resonant circuit which may be monitored by a monitor circuit and control logic previously described with reference to FIGS. 1 and 2.

As illustrated, the apparatus 800 may be designed so that fields of view 872–878 (within the illuminated area 860) of the fiber optic delay elements are adjacent, but essentially non-overlapping. As the object 820 moves through the fields of view 872–878, only two adjacent fiber optic delay elements may contribute start pulses and/or delayed pulses to a photo-detector 842. Therefore, as described above, a delay in the first zero crossing of a resonant signal generated by a resonant circuit formed by the photo-detector 842 and an inductor (not shown) may vary over a range from one half a delay between a start pulse and a delayed pulse from one of the delay lines and one half a delay between a start pulse and a delay line from an adjacent fiber optic delay element. Accordingly, the interpolation techniques described above may be utilized to determine a position of the object 820 within the combined fields of view 872–878.

It should be noted that, while four fiber optic delay elements are illustrated in FIG. 8, for different embodiments, any number of fiber optic delay elements may be used, for example, to gain a desired range and/or resolution. Further, for different embodiments, the fields of view 872–878 may have various amounts of overlap.

For some applications, one or more sensor assemblies as described above may be oriented along different relative axes to sense two dimensional (2D) or three dimensional (3D) position of an object. For example, a first one or more sensor assembly may be positioned along an X-axis, while a second one or more sensor assembly may be positioned along a perpendicular Y-axis. A 2D position of an object moving along the two axis may be determined by readings from the first and second one or more sensor assemblies. Similarly, a third one or more sensor assembly may be positioned along a third axis (e.g., a Z-axis) to provide 3D position information.

For different applications, a number of different optimizations may be made, such as fiber lengths, fields of view, and positions of fiber optic elements (i.e., fiber optic lines used, to supply start pulses and delayed pulses). Further, as previously described, a target object may be attached to a device of interest. A position of the target object may be detected in order to determine a status of the device of interest (e.g., door closed, wafer aligned, etc.). For different applications, a shape of a target object may also be optimized. FIGS. 9A–9D illustrate some exemplary shapes of target objects 920–926, respectively. The different shapes of the target objects 920–926 may allow optimizations of an amount of energy received by adjacent fiber optic elements as an object 920 moves through adjacent fields of view 972 and 974 within an illuminated area 960.

Figure 9A:
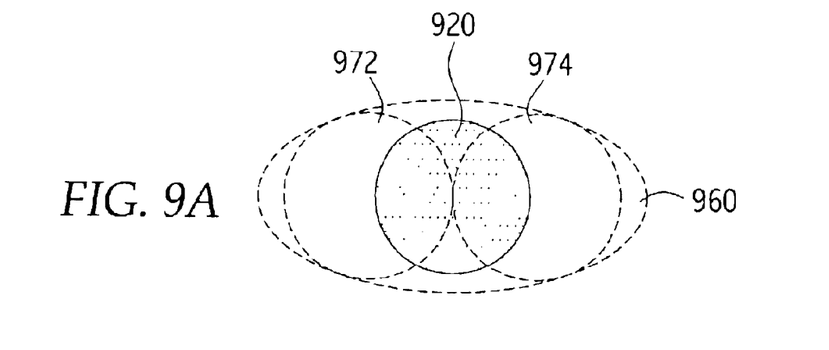
FIG. 9 illustrates exemplary target objects of differing shapes which may be used to affect position detection.
Figure 9B:
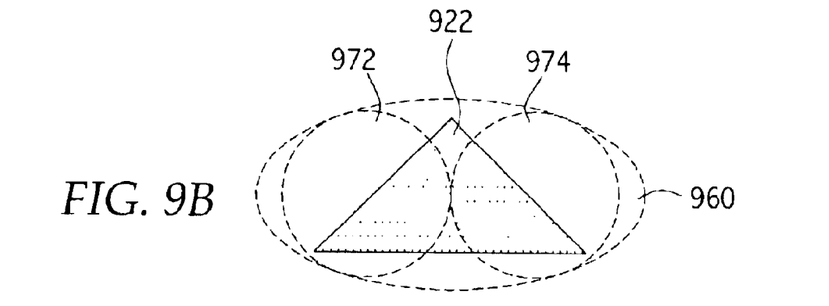
Figure 9C:
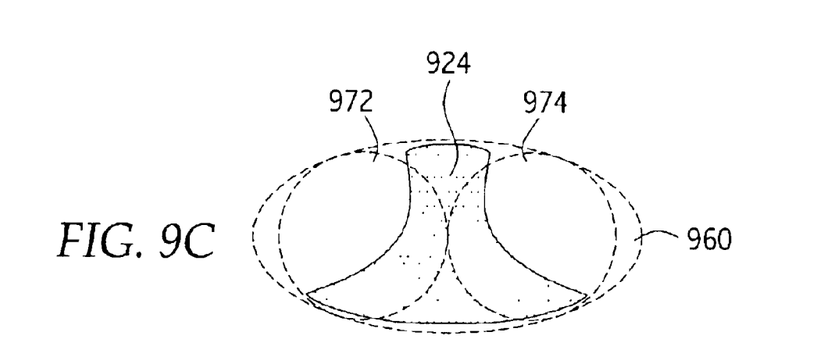
Figure 9D:
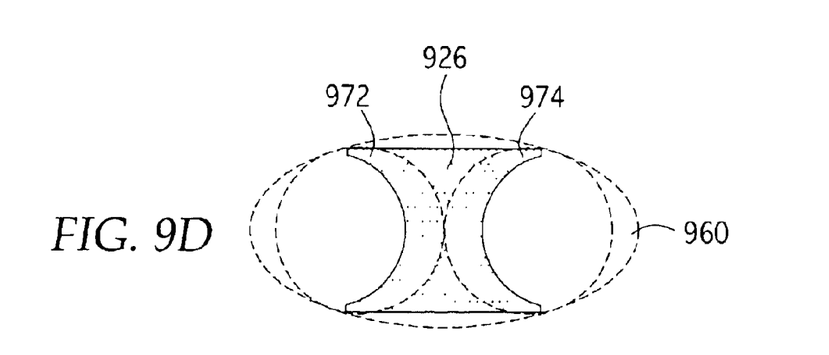

For example, as illustrated in FIG. 9A, the target object 920 may have a shape similar to the fields of view 972 and 974. Accordingly, an amount of optical energy reflected from the object 920 that is received by fiber optic delay elements having the fields of view 972 and 974 may vary substantially linearly as the object 920 moves through the fields of view 972 and 974. In other words, as the object 920 is entirely in the field of view 972, a maximum amount of optical energy reflected from the object 920 may be received by a fiber optic element having a field of view 972. Conversely, the amount of optical energy reflected from the objects 922–926 illustrated in FIGS. 9B–9D may be substantially non-linear as the objects move through the fields of view 972 and 974. These non-linearities may be used to increase sensor resolution at critical locations (i.e., when the object 924 is in both fields of view 972 and 974), for example, as the energy reflected off the object changes more rapidly at the critical locations.

Figure 10:
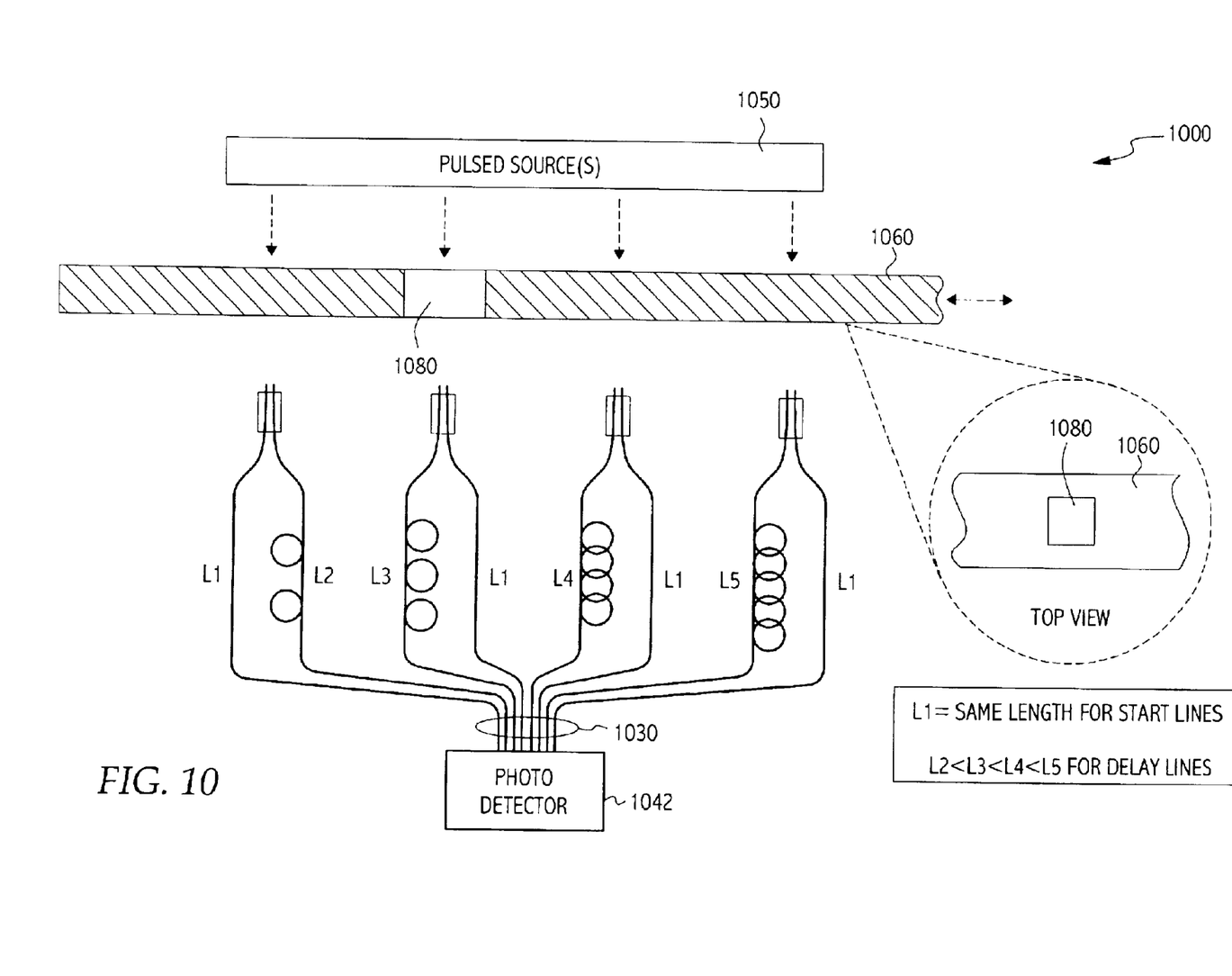
FIG. 10 illustrates a block diagram of a system for monitoring position of an object having a hole or aperture formed therein.

As illustrated in FIG. 10, for some embodiments, rather than detect optical pulses reflected off an object, a number of optical delay elements may detect optical pulses passing through an aperture (or hole) 1080 formed in an object 1060. For example, pulsed sources 1050 positioned on one side of the object 1060 may generate optical pulses to illuminate the object, while an array of fiber optic elements may be positioned on an opposite side of the object to receive optical pulses passing through the aperture 1080. The fiber optic delay elements may deliver start pulses and delayed pulses to a detector 1042, as previously described with respect to reflected pulses. In other words, optical pulses passing through the aperture 1080 are analogous to the previously described pulses reflecting off an object. Though not represented in FIG. 10, the detector 1042 may form a resonant circuit with an inductor, and the previously described techniques may be utilized to determine a position of the aperture 1080 and, hence, a position (as well as velocity and acceleration) of the object 1060.

A single low cost sensor as described above may have an advantage over prior art systems that require more than one sensor for position determination. Further, a single sensor may have a further advantage associated with aging and heat affect, due to commonality of a single photo-detector.

Accordingly, embodiments of the present invention provide methods and apparatus that may be utilized to sense position and/or velocity of objects in a wide variety of automated manufacturing facilities including, but not limited to, automotive assembly facilities, electronics assembly facilities, and IC fabrication facility. For example, in an IC fabrication facility, embodiments of the present invention may be used in coordination with advanced wafer handlers to determine both position and velocity of a number of moving objects throughout a facility. For some embodiments, low cost sensors may be utilized to sense silicon wafers for robot calibration to chambers. The sensors may be used for real time (on the fly) center finding and wafer monitoring. For example, low cost sensors may be utilized to detect a position of a wafer when placing the wafer in a measurement location prior to wafer mapping.

Sensors may also be used to determine a relative position of a slit valve door, a position of robot end effectors or a chuck position. Further, for some embodiments, a light curtain may be formed from an array of opposing optical pulse sources and optical elements to receive optical pulses generated by the optical pulse sources. An object penetrating the light curtain may prevent one or more optical element from receiving optical pulses from opposing optical pulse sources. The lack of optical pulses may cause a change in resonant signals (i.e., a first zero crossing of the resonant signals may change from an extended zero crossing back to a natural resonant zero crossing), providing coordinates of penetration.

While the foregoing is directed to embodiments of the present invention, other and further embodiments of the invention may be devised without departing from the basic scope thereof, and the scope thereof is determined by the claims that follow.

What is claimed is:

1. A method for determining a position of an object comprising:
   (a) illuminating the object with an optical pulse source;
   (b) supplying a first optical pulse to a photo-detector to cause a resonant circuit formed by the photo-detector and an inductor to generate a resonant signal;
   (d) supplying at least a second optical pulse to the photo-detector to cause a change in the resonant signal, wherein the second optical pulse is reflected from the object;
   (e) monitoring a change in the resonant signal; and
   (f) determining a position of the object based on the monitored change in the resonant signal.

2. The method of claim 1, wherein monitoring the change in the resonant signal comprises monitoring energy of the resonant signal.

3. The method of claim 1, wherein monitoring the change in the resonant signal comprises detecting a first zero crossing of the resonant signal.

4. The method of claim 3, wherein monitoring the change in the resonant signal further comprises measuring a time of the first zero crossing with a counter.

5. The method of claim 4, wherein determining the position of the object comprises:
   reading a count value from the counter; and
   retrieving a position value from a lookup table based on the count value.

6. The method of claim 1, wherein supplying the first optical pulse to the photo-detector comprises supplying an optical pulse from the optical pulse source to the photo-detector via a fiber optic line.

7. The method of claim 1, wherein supplying the first optical pulse to the photo-detector comprises supplying an optical pulse reflected from the object to the photo-detector via a fiber optic line.

8. The method of claim 1, further comprising supplying at least a third optical pulse to the photo-detector, wherein the third optical pulse arrives at the photo-detector after the second optical pulse.

9. The method of claim 1, wherein the second optical pulse arrives at the photo-detector within a first quarter cycle of a resonant cycle period of the resonant signal.

10. The method of claim 1, further comprising:
    repeating steps (a) through (f) to determine another position of the object; and
    calculating a velocity of the object based upon the determined positions.

11. An apparatus for determining a position of an object comprising:
    a means for illuminating the object;
    a resonant circuit comprising a photo-detector and an inductor;
    a first fiber optic line to supply a first optical pulse to the photo-detector, causing the resonant circuit to generate a resonant signal;
    at least a second fiber optic line to supply a second optical pulse reflected from the object to the photo-detector- causing a change in the resonant signal; and
    control circuitry adapted to monitor the resonant signal and determine a position of the object based on the change in the resonant signal.

12. The apparatus of claim 11, wherein the means for illuminating the object is a pulsed laser.

13. The apparatus of claim 11, wherein a natural resonant frequency of the resonant circuit is between 1.5 MHz and 3.4 MHz.

14. The apparatus of claim 11, wherein the first fiber optic line is disposed between the illuminating means and the photo-detector.

15. The apparatus of claim 11, wherein one end of the first fiber optic line is positioned to receive an optical pulse reflected from the object.

16. The apparatus of claim 11, wherein the control circuitry is further adapted to determine a velocity of the object based on successive position measurements.

17. The apparatus of claim 11, wherein the control circuitry is further adapted to generate an output signal indicative of a determined position of the object.

18. The apparatus of claim 17, wherein the output signal is an analog signal.

19. The apparatus of claim 17, wherein the output signal is a bussed signal.

20. The apparatus of claim 11, further comprising a third fiber optic line with a first end optically coupled with the illuminating means and a second end positioned to illuminate the object.

21. An apparatus for determining a position of an object comprising:
    a means for illuminating the object;
    a photo-detector and an inductor forming a resonant circuit;
    a first fiber optic line to supply a first optical pulse from the illuminating means to the photo-detector, causing the resonant circuit to generate a resonant signal;
    a second fiber optic line to supply a second optical pulse reflected from the object to the photo-detector causing a change in a first cycle period of the resonant signal; and
    control circuitry adapted to determine a position of the object based on the change in the first cycle period of the resonant signal and generate an output indicative of the determined position.

22. The apparatus of claim 21, wherein the illuminating means is a pulsed light emitting diode.

23. The apparatus of claim 21, wherein lengths of the first and second fiber optic lines are chosen to ensure the second optical pulse arrives at the photo-detector within a first quarter cycle of the first cycle period of the resonant signal.

24. The apparatus of claim 21, wherein the control circuitry comprises a counter and a comparator circuit adapted to generate a signal to gate the counter in response to detecting a first zero crossing of the resonant signal.

25. The apparatus of claim 24, wherein the counter has a resolution better than 1 ns, wherein better resolution corresponds to smaller increments of time.

26. The apparatus of claim 24, wherein the control circuitry further comprises a controller configured to determine a position of the object based on a count value read from the counter.

27. The apparatus of claim 26, wherein the controller is further configured to calculate a velocity of the object based on different position measurements.

28. The apparatus of claim 27, wherein the control circuitry is further adapted to determine an acceleration of the object based on successive velocity measurements.

29. An apparatus for determining a position of an object comprising:
   a means for illuminating the object;
   a resonant circuit comprising a photo-detector and an inductor;
   at least two optical delay elements, each having,
      a first fiber optic line to supply a first optical pulse reflected from the object to the photo-detector, causing the resonant circuit to generate a resonant signal, and
      a second fiber optic line adjacent the first fiber optic line to supply a second optical pulse reflected from the object to the photo-detector causing a change in a first cycle period of the resonant signal,
   wherein each first fiber optic line is substantially equal in length and each second fiber optic line is different in length and greater in length than each first fiber optic line; and
   control circuitry adapted to determine a position of the object based on the change in the first cycle period of the resonant signal and generate an output indicative of the determined position.

30. The apparatus of claim 29, wherein, for each optical delay element, the first optical pulse supplied to the photo detector by the first fiber optic line and the second optical pulse supplied to the photo detector by the second fiber optic line are substantially equal in amplitude and width.

31. The apparatus of claim 29, further comprising a fiber optic line having a first end optically coupled with the illuminating means and a second end positioned between the at least two optical delay elements.

32. The apparatus of claim 29, wherein the illuminating means is a pulsed light emitting diode.

33. The apparatus of claim 29, wherein lengths of the first and second fiber optic lines of each element are chosen to ensure the second optical pulse supplied by each second fiber optic line arrive at the photo-detector within a first quarter cycle of the first cycle period of the resonant signal.

34. The apparatus of claim 29, wherein the control circuitry comprises a counter and a comparator circuit adapted to generate a signal to gate the counter in response to detecting a first zero crossing of the resonant signal.

35. The apparatus of claim 29, wherein the fields of view of each of the at least two optical delay elements are non-overlapping.

36. The apparatus of claim 29, wherein the at least two optical delay elements comprise at least four optical delay elements, wherein the lengths of each second fiber optic line is different and greater than each first fiber optic line.

37. The apparatus of claim 36, wherein the fields of view of each of the at least four optical delay elements are non-overlapping.

38. A system for determining a status of an object comprising:
   a target attached to the object;
   means for illuminating the target;
   a resonant circuit comprising a photo-detector and an inductor;
   a first fiber optic line to supply a first optical pulse to the photo-detector, causing the resonant circuit to generate a resonant signal;
   at least a second fiber optic line to supply a second optical pulse reflected from the target to the photo-detector causing a change in the resonant signal; and
   control circuitry adapted to monitor the resonant signal and determine a status of the object based on the change in the resonant signal.

39. The system of claim 38, wherein a shape of the target corresponds to a shape of a field of view of the second fiber optic line.

40. The system of claim 38, wherein the target comprises a pyramid.

41. The system of claim 38, wherein the object is a silicon wafer.

42. An apparatus for determining a position of an object having an aperture or hole formed through opposing first and second surfaces, comprising:
   a means for illuminating the first surface of the object;
   a resonant circuit comprising a photo-detector and an inductor;
   at least two optical delay elements, each having,
      a first fiber optic line to supply a first optical pulse passed through the aperture or hole formed in the object to the photo-detector, causing the resonant circuit to generate a resonant signal, and
      a second fiber optic line adjacent the first fiber optic line to supply a second optical pulse passed through the aperture or hole formed in the object to the photo-detector causing a change in a first cycle period of the resonant signal,
   wherein each first fiber optic line is substantially equal in length and each second fiber optic line is different in length and greater in length than each first fiber optic line; and
   control circuitry adapted to determine a position of the object based on the change in the first cycle period of the resonant signal and generate an output indicative of the determined position.

43. The apparatus of claim 42, wherein the illuminating means is a pulsed light emitting diode.

44. The apparatus of claim 42, wherein the control circuitry is further adapted to determine a velocity of the object based on successive position measurements.

* * * * *

UNITED STATES PATENT AND TRADEMARK OFFICE
CERTIFICATE OF CORRECTION

PATENT NO. : 6,803,998 B2
APPLICATION NO. : 10/224038
DATED : October 12, 2004
INVENTOR(S) : Reginald W. Hunter and Joel B. Bailey Page 1 of 1

It is certified that error appears in the above-identified patent and that said Letters Patent is hereby corrected as shown below:

Column 5, Line 45: Change "provides" to --provide--

Column 6, Line 45: Insert a comma after "152"

Column 7, Lines 43 and 44: Change each instance of "us" to --µs--

Column 10, Line 50: Delete the second instance of "will be"

Column 11, Line 58: Change "axis" to --axes--

Column 11, Line 66: Delete the comma after "used"

Column 14, Claim 11, Line 11: Change "photo-detector-" to -- photo-detector --

Signed and Sealed this

Twenty-first Day of November, 2006

JON W. DUDAS
*Director of the United States Patent and Trademark Office*